United States Patent [19]

Sperrle

[11] 3,961,776

[45] June 8, 1976

[54] MIXING AND KNEADING DEVICE

[75] Inventor: Kurt Sperrle, Stuttgart, Germany

[73] Assignee: Werner & Pfleiderer, Stuttgart, Germany

[22] Filed: June 19, 1974

[21] Appl. No.: 480,970

[30] Foreign Application Priority Data

July 28, 1973 Germany ............................ 2338456

[52] U.S. Cl. ................................ 259/192; 259/104; 259/110

[51] Int. Cl.[2] ............................................ B29B 1/10

[58] Field of Search .................. 259/DIG. 1, DIG. 2, 259/DIG. 3, 191, 192, 193, 194, 104, 103, 109, 110, 107, 108, 9, 10, 5, 6, 25, 26, 21, 64, 68, 69

[56] References Cited

UNITED STATES PATENTS

| | | | |
|---|---|---|---|
| 2,090,434 | 8/1937 | Thalmann | 259/191 |
| 3,510,154 | 5/1970 | Sheff | 24/263 A |
| 3,833,204 | 9/1974 | Hehl | 259/191 |
| R27,979 | 4/1974 | Johansson | 259/191 |

FOREIGN PATENTS OR APPLICATIONS

| | | |
|---|---|---|
| 1,195,722 | 7/1965 | Germany |

*Primary Examiner*—Robert W. Jenkins
*Attorney, Agent, or Firm*—Hane, Baxley & Spiecens

[57] ABSTRACT

There is disclosed a mixing and kneading device for processing material such as synthetic plastics material. The device, which is designed primarily for use in a laboratory or for research and development work, consists of a power drive unit and a work unit. The work unit comprises a receptacle and is composed of a part adjacent to the drive unit and a part remote from the drive unit for placing thereinto a supply of material to be processed. Suitable mixing and kneading tools are journalled within the receptacle and releasably coupled to the power drive unit. The two receptacle parts are locked by an easily releasable clamping means to each other and to the power unit. Release of the clamping means selectively releases only the remote part of the receptacle or both parts from the drive unit, thereby permitting convenient and rapid emptying and cleaning of the receptacle, and also of the kneading and mixing tools after completion of a processing operation.

5 Claims, 1 Drawing Figure

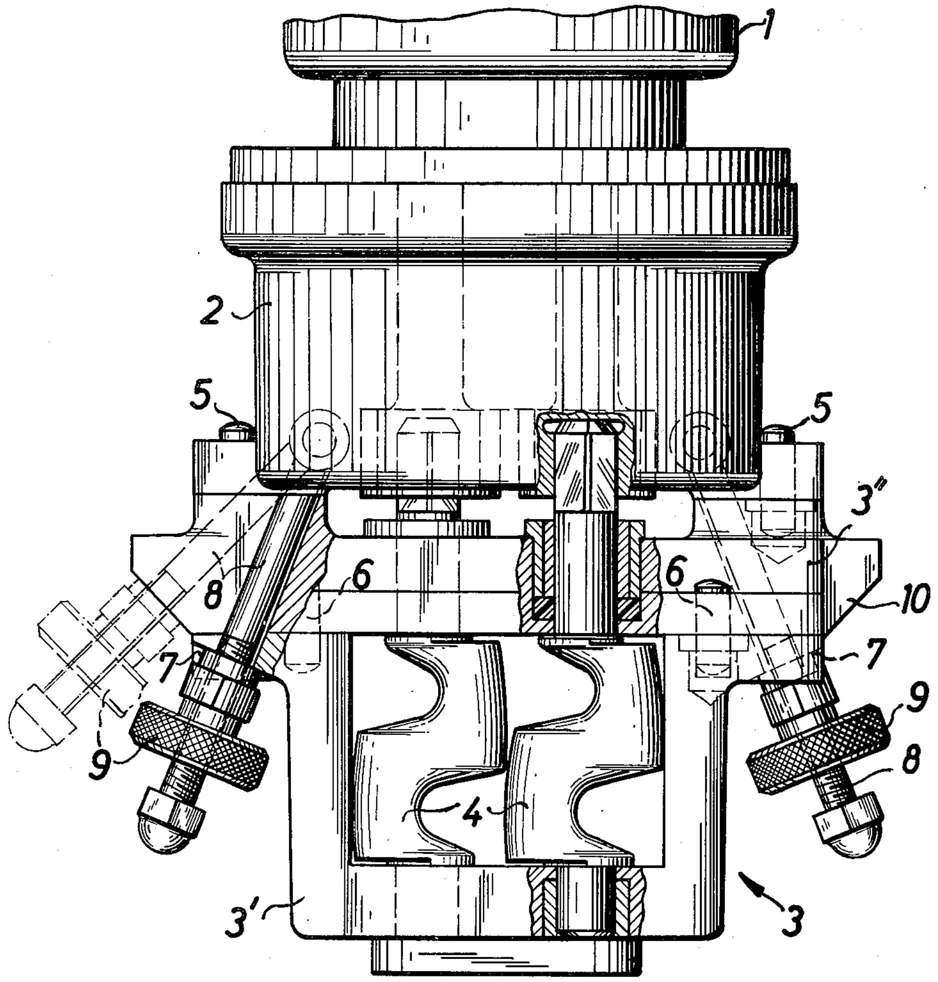
1
2
5
5
3"
8
6
6
10
7
7
9
9
8
4
3'
3

MIXING AND KNEADING DEVICE

The invention relates to a mixing and kneading device for mixing and kneading materials such as synthetic plastics or, more particularly, to a kneading and mixing device for use in laboratories and in connection with research and development work.

BACKGROUND

There are known mixing and kneading devices of the general type above-referred to which comprise a power drive means including an electric motor with a gearing coupled thereto and a receptacle for a supply of the material to be mixed and kneaded therein. Mixing and kneading means disposed in the receptacle are journalled in the end walls thereof and secured to the gearing by suitable releasable fastening means. The receptacle is composed of two superimposed parts and constitutes, together with the power drive means, a closed-off work unit. This working unit is joined to the power drive means by releasable fastening means. Mixing and kneading devices of the general type above-described are described, for instance, in German Pat. No. 1,195,722. They have been found generally satisfactory, particularly for use in testing or research and development laboratories since the mixing and kneading receptacle when ready to be emptied can be detached from the device. The detached receptacle can then be replaced by another receptacle which is already charged with material to be mixed and kneaded. It is also advantageous that the power drive means needs to be stopped by only a short time before it can be restarted after attachment of another receptacle containing new material to be processed.

However, the emptying, cleaning and the generally used powdering of the receptacle is quite time consuming; the more so as many of the materials as are mixed and kneaded in such devices tend to have a high viscosity and/or to be sticky. Moreover, with many of the types of materials which are processed in mixing and kneading devices of the kind here involved complete emptying and cleaning of the receptacle and also of the mixing and kneading tools within the receptacle require a complete disassembly of the device.

With mixing and kneading devices of the general type herein-referred to as now known, complete disassembly of the receptacle is rather complex and time-consuming since the two parts of the receptacle are joined by a substantial number of screws, which must be unscrewed by appropriate tools such as screwdrivers. Such delay before the receptacle is ready for emptying and cleaning and subsequent recharging is disadvantageous because many of the materials to be processed in these devices harden rather rapidly. Accordingly, emptying and cleaning should be effected as quickly as possible upon completion of a mixing and kneading operation. It has been found in practice that in such cases the time required for removing the screws used for joining the two parts of the receptacle is long enough to permit hardening of the mixed and kneaded material to such an extent that a thorough emptying and cleaning of the receptacle is at best difficult and sometimes virtually impossible.

THE INVENTION

It is a broad object of the invention to provide a novel and improved mixing and kneading device of the general kind referred to in which all the afore-pointed out advantages of the now known devices are preserved, and which has the additional and important advantage that the disassembly of the receptacle after completion of the processing of material can be so rapidly effected that the material has no time to harden to any substantial extent and that, hence, complete emptying and cleaning of the receptacle are greatly facilitated.

A more specific object of the invention is to provide a novel and improved mixing and kneading device of the general kind above-referred to in which detachment of the receptacle from the power drive means and the disassembly of the receptacle into its parts are so simplified that only very few parts have to be loosened and that such loosening can be effected under a minimal period of time.

SUMMARY OF THE INVENTION

The afore-pointed out objects, features and advantages and other objects, features and advantages which will be pointed out hereinafter are obtained by providing a power drive means including a motor and gearing and a receptacle for mixing and kneading therein a supply of material such as synthetic plastics material. This receptacle is composed of two superimposed parts, one being disposed adjacent to the drive means and constituting an end wall of the receptacle and the other being disposed remote from the drive means and including the side wall and the other end wall thereof. Rotary mixing and kneading means are disposed within the receptacle and journalled in the end walls thereof. These mixing and kneading means are releasably coupled to the power drive means. Clamping means are hinged to the power drive unit and selectively movable into and out of clamping engagement with a clamping surface on the receptacle part including the remote end wall and the side wall.

As it is apparent, release of the clamping means permits removal of both receptacle parts and also frees the mixing and kneading means for detachment from the power drive means. Accordingly, emptying and cleaning of the receptacle and also of the mixing and kneading means can be effected virtually immediately after the completion of a processing operation, thereby effectively avoiding the afore-pointed out problems caused by rapid hardening of the material mixed and kneaded in the receptacle.

The invention also provides that, if desirable, only the receptacle part including the remote end wall and the side wall, i.e., the receptacle part remote from the power drive means is released as in some instances, this is sufficient to effect satisfactory and rapid emptying and cleaning of the receptacle. For this purpose, the clamping means are so arranged that they can be moved from the position in which they clamp both receptacle parts to each other and to the power drive means into a position in which they clamp only the receptacle part adjacent to the drive means, i.e., the other receptacle part, to the power drive means.

The removal of the remote receptacle part only has the advantage that the mixing and kneading means can be activated for a short period of time. Such activation tends to effect more or less complete self-cleaning of these means due to the centrifugal force acting about residual material adhering to the mixing and kneading means.

According to a further aspect of the invention, shifting of the clamping means from the position in which they clamp the two receptacle parts to each other and to the power drive means to the position in which only the receptacle part adjacent to the drive means is clamped to the power drive means is simplified and expedited by placing clamping surfaces with which the clamping means coact for the purpose of clamping of one or both receptacle parts to the power drive means into closely adjacent juxtaposed positions.

BRIEF DESCRIPTION OF THE DRAWING

In the accompanying drawing a preferred embodiment of the invention is shown by way of illustration and not by way of limitation. The single drawing FIGURE shows a plan view, partly in section, of a mixing and kneading device for laboratory use.

DETAILED DESCRIPTION OF THE DRAWING

Referring now in detail to the exemplified mixing and kneading device, this device comprises a power drive means including an electric motor 1 and a gearing 2 coupled to the motor. The device further comprises a receptacle 3 for a supply of material to be mixed and kneaded. As will be more fully described hereinafter, this receptacle has a side wall, an end wall adjacent to the power drive means and an other end wall remote from the drive means. Mixing and kneading means 4 of conventional design are journalled in the end walls of the receptacle and drivingly coupled to the gearing by suitable releasable fastening means such as plug-in members. To assure correct locating of the receptacle and thus of the mixing and kneading means 4, locating means such as locating pins 5 are preferably provided at a housing for gearing 2.

As it is now apparent, the power drive means, i.e., the motor with the gearing coupled thereto, and the mixing and kneading means 4 constitute a self-contained power unit.

The mixing and kneading receptacle 3 is composed of two superimposed parts 3' and 3'', part 3' being remote from the power drive means and including one end wall and the side wall of the receptacle and part 3'' being adjacent to the drive means and including the other end wall of the receptacle. As it is shown, the remote end wall may be formed with two dishshaped depressions. The two receptacle parts 3' and 3'' are located relative to each other by locating pins 6.

To lock the two receptacle parts to each other and to the power drive means, readily and rapidly releasable clamping means are provided which coact with clamping surface 7 provided on receptacle part 3', i.e., on the receptacle part disposed distal from the power drive means.

The clamping means are shown as comprising screw bolts 8 hinged to the housing of gearing 2 and preferably curled nuts 9. No further fastening means between the receptacle parts 3' and 3'' are provided or necessary. Accordingly, detachment of the working unit as formed by the two parts of the receptacle from the power unit is effected by loosening screwbolts 8 which are located in the full line position, that is, in engagement with clamping surfaces 7 when the device is operational and to swing the bolts clear of surface 7. In the event that for emptying the receptacle it is merely necessary or desirable to detach receptacle part 3' from the power drive, the screwbolts 8 are swung into the dotted line position in which they coact with clamping surfaces 10 provided on receptacle part 3''. As a result of such placement of bolts 8, receptacle part 3'' remains attached to the power drive unit.

As it is clearly apparent from the drawing, the clamping surfaces 7 and 10 are located side by side on receptacle parts 3' and 3'', respectively, so that the shift of bolts 8 from one position into the other position can be effected easily and in a minimal period of time.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A mixing and kneading device comprising in combination:

a power drive means including a motor, a gearing and a housing for said motor and gearing;

a receptacle for mixing and kneading therein a supply of material and having a side wall and end walls;

rotary mixing and kneading means within said receptacle and journalled in said end walls thereof, said mixing and kneading means being releasably coupled to said power drive means thereby constituting a power unit therewith, said receptacle being composed of two separate parts, one part being disposed adjacent to said power drive means and the other part being disposed remote from the power drive means and in lengthwise superimposition with said one part, said adjacent one part including one of said end walls and said remote other part including the other end wall and the side wall; and clamping means for releasably clamping said receptacle parts to each other and to said power drive means for support by the same, said clamping means including at least one elongate member hinged at one end to said power drive means and a clamping surface on said remote other receptacle part, said surface being provided on a lateral protrusion of said side wall, and said elongate clamping member being swingable into and out of clamping engagement with said clamping surface, engagement of the clamping member with said surface clamping the two separate receptacle parts to each other and jointly to the power drive means and disengagement of the clamping member freeing both parts of the receptacle from each other and from the power drive means.

2. The mixing and kneading device according to claim 1 and comprising a second clamping surface on said adjacent receptacle part, said elongate clamping member being selectively swingable into clamping engagement with either one of said surfaces, placement of the clamping member into engagement with the second clamping surface freeing said remote receptacle part for removal from said adjacent receptacle part but retaining said adjacent receptacle part clamped to the power drive means.

3. The mixing and kneading device according to claim 2 wherein said elongate clamping member includes means for varying the effective length of said member.

4. The mixing and kneading device according to claim 3 wherein said elongate member comprises a screwbolt and a nut threaded thereupon, selective axial displacement of said nut moving the bolt into and out of clamping engagement with the respective clamping surface.

5. The mixing and kneading device according to claim 2 wherein said first and second clamping surfaces are disposed in juxtaposition.

* * * * *